United States Patent
Bloch et al.

(12)

(10) Patent No.: US 6,488,398 B1
(45) Date of Patent: Dec. 3, 2002

(54) VARIABLE F/NUMBER SUBSTAGE ILLUMINATOR FOR MULTIPLE MAGNIFICATION AND ZOOM TELECENTRIC SYSTEM

(75) Inventors: Stephanie M. Bloch, Rush, NY (US); Albert G. Choate, Rush, NY (US)

(73) Assignee: Optical Gaging Products, Inc., Rochester, NY (US)

( * ) Notice: Subject to any disclaimer, the term of this patent is extended or adjusted under 35 U.S.C. 154(b) by 69 days.

(21) Appl. No.: 09/692,860

(22) Filed: Oct. 23, 2000

(51) Int. Cl.[7] .............................. F21V 5/00; A45D 42/10
(52) U.S. Cl. ........................ 362/575; 362/560; 359/387; 359/368
(58) Field of Search ................................ 362/268, 560, 362/293, 301, 575; 359/385, 389, 368, 387, 601, 738, 739

(56) References Cited

U.S. PATENT DOCUMENTS

| | | | | |
|---|---|---|---|---|
| 2,674,157 A | * | 4/1954 | Heine | 362/575 |
| 3,971,621 A | * | 7/1976 | Albrecht-Buehler | 362/575 |
| 4,640,589 A | * | 2/1987 | Reich | 362/575 |
| 4,998,810 A | * | 3/1991 | Sander et al. | 359/389 |
| 6,040,940 A | * | 3/2000 | Kawasaki | 359/389 |

* cited by examiner

Primary Examiner—Thomas M. Sember
Assistant Examiner—Bao Truong
(74) Attorney, Agent, or Firm—Shlesinger, Fitzsimmons & Shlesinger

(57) ABSTRACT

The substage illuminator is in the form of a housing having therein an opening disposed to register with the underside of a workpiece that is being inspected by optical gaging apparatus which is disposed to overlie the workpiece and which has an image inlet aperture registering with the opening in the substage housing. A collimating lens is mounted in the opening of the housing beneath an anti-reflection filter, and a light source which is mounted in or connected to the housing, projects a circular beam of light successively through the collimator lens and filter toward the underside of the inspected workpiece. The light source may be in the form of a plurality of radially spaced, circular arrays of LED's that can be selectively illuminated to control the diameter of the beam emitted thereby, or the source may comprise an L.C.D. aperture generator which may be energized to produce light beams of selectively different diameters. An adjustable iris aperture also can be mounted in the housing between the light source and collimating lens further to control the diameter of the light beam transmitted to the collimating lens. A light shaping diffuser may be mounted in the housing between the light source and the adjustable iris diaphragm to homogenize light transmitted by the light source.

20 Claims, 5 Drawing Sheets

VARIABLE F/NUMBER SUBSTAGE ILLUMINATOR FOR MULTIPLE MAGNIFICATION AND ZOOM TELECENTRIC SYSTEM

BACKGROUND OF THE INVENTION

This invention relates to an improved substage illuminator for use with optical inspection systems, and more particularly for use with variable magnification telecentric systems.

In a microscope system, as distinguished from gaging systems for inspecting workpieces, and the like, the object plane is essentially fixed, so that a substage collimator typically consists of an illumination source focused on the thin object that is being observed by the microscope. Usually a field stop aperture is provided near the object, while an adjustable iris at the lens serves to adjust the F-number of illumination to match the magnification in use. This can then provide the proper angular range of illumination for best imaging, while minimizing over-exposure and heating of biological specimens.

However, in gaging applications the location of the object that is being inspected is allowed to vary over a considerable range, and the effects of improper collimation are more problematical due to a condition referred to as "wall-effect". For example, when viewing objects such as cylinders lying in the focal plane, the image of the sides of the object is confounded because of obstruction of the illumination and imaging cones of light, while distorted images of the substage illuminator reflected off of the object's sides create inaccuracies. It has been discovered that these effects are minimized when the substage illuminator is designed to exactly fill the aperture of the magnification system in use, where a variety of magnifications and F-numbers are available. An improved substage illuminator of the type described would be particularly suitable for use in connection with inspection apparatus as disclosed in U.S. Pat. No. 5,668,665 which describes a system offering a variety of magnifications, and also the continuous zoom system disclosed in U.S. Pat. No. 5,523,583, both of which patents are owned by the assignee of the instant invention.

In each of the two above-noted U.S. patents the work that is to be inspected or gaged is mounted on a work support beneath the objective lens and surface illuminator of the optical inspection apparatus and in registry with a central opening or transparent section of the work support. Positioned beneath the work support is a conventional substage light source which is disposed to project illumination through the work support onto the underside of the workpiece, while the upper side of the workpiece may also be illuminated by surface illuminator portions of the apparatus. As noted above, among the problems associated with conventional substage illuminators is the fact that imaging cones of light from the substage illuminator are reflected from the sides of the inspected object, particularly cylindrically shaped objects, thereby creating inaccuracies in the gaging thereof.

It is an object of this invention, therefore, to provide an improved substage illuminator, which is particularly suitable for use with optical inspection apparatus for any type which is adjustable to provide therefor a variety of magnifications and F-numbers.

A more specific object of this invention is to provide for adjustable optical inspection apparatus of the type described, an improved substage illuminator having means for controlling its light source diameter, thereby exactly to fill the aperture of the optical inspecting apparatus for any number of different magnifications and F-numbers thereof.

Other objects of the invention will be apparent hereinafter from the specification and from the recital of the appended claims, particularly when read in conjunction with the accompanying drawings.

SUMMARY OF THE INVENTION

The substage illuminator contains or has connected thereto a light source for projecting a circular beam of light out of an opening in the housing to the underside of a workpiece, which is positioned beneath the inlet aperture of variable magnification apparatus that is employed for inspecting and gaging the workpiece. The diameter of the beam produced by the light source can be adjusted to compensate for any changes in the F/number or magnification of the associated gaging apparatus. The diameter can be made adjustable by employing as a light source a plurality of radially spaced circular arrays of light emitting diodes, the arrays of which can be selectively energizable to produce a circular beam of the desired diameter, or the source can comprise a circular L.C.D. aperture generator, which also can be operated to emit beams of light of selectively different diameters. In either case the beams of light are passed through a collimating lens which is secured over the light emitting end of the housing beneath an anti-glare filter. To permit even further adjustment of the diameter of the light beam emitted by the light source, an adjustable iris diaphragm is mounted in the housing between the light source and the collimating lens. The light source may also comprise a fiber optics conductor producing a circular beam of light which is transmitted successively through a light shaping diffuser and adjustable iris diaphragm, which are interposed between the light source and the collimating lens. In each embodiment the diameter of the light beam emitted from the housing can be adjusted to fill the inlet aperture of the optical gaging apparatus in order to compensate for any change in the magnification and F/number of the inspection apparatus.

THE DRAWINGS

DETAILED DESCRIPTION OF THE PREFERRED EMBODIMENTS

Figure 2:
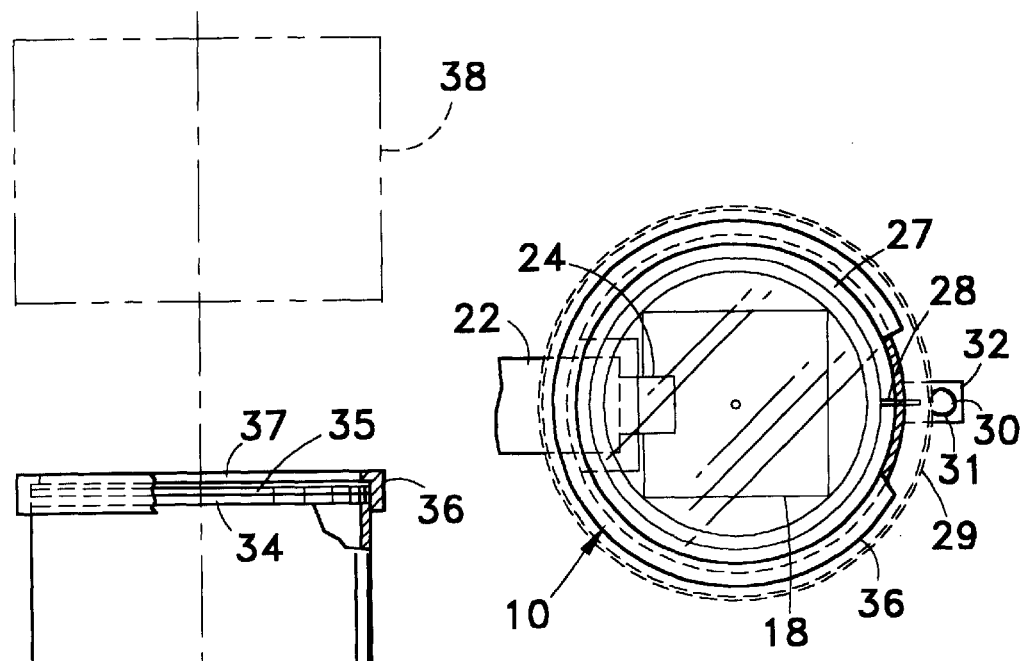
FIG. 2 is a plan view of this illuminator.
Figure 1:
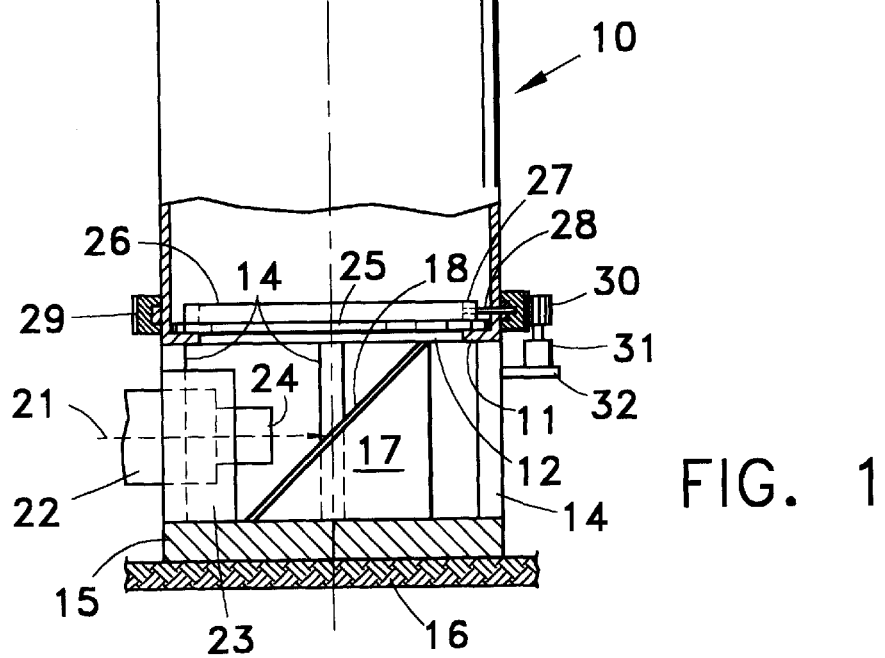
FIG. 1 is an elevational view of one side of an improved substage illuminator made according to one embodiment of this invention, portions of the illuminator housing being broken away and shown in section for purposes of illustration, and the associated inspection apparatus being shown in phantom by broken lines.

Referring now to the drawings by numerals of reference, and first to FIGS. 1 and 2, 10 denotes generally a cylindrical housing or barrel open on its upper end, and having a closed lower end 11 which has therethrough large, central, circular opening 12 disposed coaxially of the barrel 10. Barrel 10 is secured at its lower end on the upper ends of a plurality of spaced, vertically disposed posts 14, the lower ends of which are secured to the upper surface of a mounting plate 15 disposed to be secured horizontally on the support 16, which could be mounted for adjustment in a horizontal plane if desired. Secured to the inclined upper surface of a triangularly shaped block 17 which is secured on the upper surface of plate 15 centrally of opening 12 is a mirror 18, the reflective surface of which is inclined at an angle 45° to the horizontal, and which registers centrally with the opening 12 in the bottom of barrel 10. As shown more clearly in FIG. 1, the upper edge of the inclined mirror 18 registers with the underside of barrel 10, while the lower edge thereof registers with the upper surface of the plate 15.

The center of the reflective surface of the mirror 18 also registers with the centerline 21 of a light source in the form of a fiber optics conductor 22, which is mounted adjacent its discharge end in the support 23 on plate 15. The light emitted from the discharge end 24 of conductor 22 is directed centrally onto the reflective surface of the mirror 18 where it is reflected upwardly into barrel 10 through the opening 12 in the lower end thereof The light entering barrel 10 passes first through a circular light shaping diffuser 25, which is mounted coaxially in the bottom of barrel 10, beneath an adjustable iris 26 which is mounted in the lower end of barrel 10 to overlie the diffuser 25. The adjustable iris 26 may be of the type disclosed in the above-noted U.S. Pat. No. 5,523,583, and to that end has rotatably mounted thereon a diaphragm adjusting ring 27 which is secured adjacent its outer peripheral surface to one end of the diaphragm setting pin 28. Pin 28 projects intermediate its ends slidably through an elongate slot formed in the annular wall of barrel 10, and is secured at its outer end in an annular adjusting ring 29 that is mounted for rotation coaxially about the barrel 10 adjacent the lower end thereof. As in the case of the adjusting ring disclosed in the U.S. Pat. No. 5,523,583, the ring 29 has formed on its outer peripheral surface a plurality of gear teeth which mesh with teeth of the pinion gear 30 that is secured to the drive shaft of a stepping motor 31 that is secured on a bracket 32 that extends from one of the barrel supporting posts 14. Motor 31, which in practice may be under control of a computer program, can be operated to effect adjustment of a diaphragm in the iris 26.

After illumination from the mirror 18 is projected through the diffuser 25 and the diaphragm opening in iris 26, it passes upwardly through the barrel 10 and successively through a Fresnel-collimation lens 34 and an anti-reflection filter 35, which are secured coaxially one above the other in the upper, open end of barrel 10 beneath an annular retainer cap 36, which is removably secured over the upper end of housing 10. Cap 36 has therethrough a large, central, circular opening 37 which overlies the filter 35 and the lens 34 that are secured therebeneath.

In use, light emitted from the upper end of barrel 10 is directed in the usual manner onto the underside of a workpiece (not shown) that is to be inspected, and towards the aperture of a magnification system, which is shown in phantom by broken lines at 38 in FIG. 1, and which system may be, by way of example, a system of the type disclosed in either of the two above-noted patents, U.S. Pat. Nos. 5,668,665 or 5,523,583, as well as any other type of zoom optical inspection system. By using the light shaping diffuser 25 to diffuse light passing through the iris 26, the filter transmits a circle or cone of light at approximately the proper diameter, while the adjacent iris diaphragm provides even a more continuous range of adjustment of the beam to exactly fill the aperture in the associated magnification apparatus 38. Also, of course, the anti-reflection filter 35 and the Fresnel-collimating lens serve finally to eliminate any undesirable reflections which may be produced by any associated surface illuminator equipment.

Figure 4:
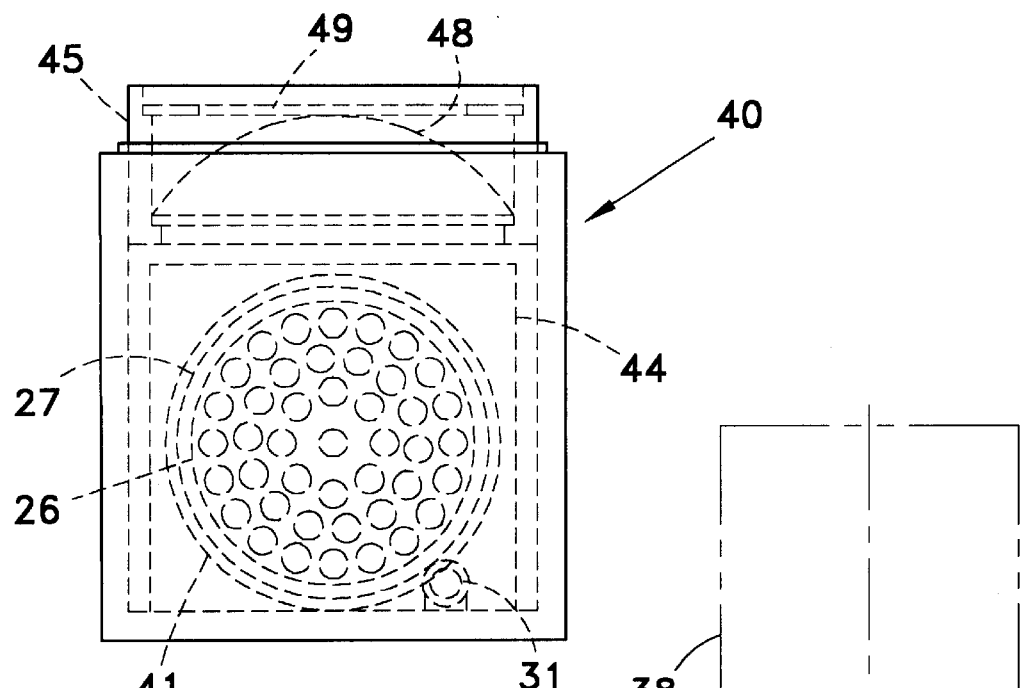
FIG. 4 is an end elevational view looking at the right end of the illuminator shown in FIG. 3.
Figure 3:
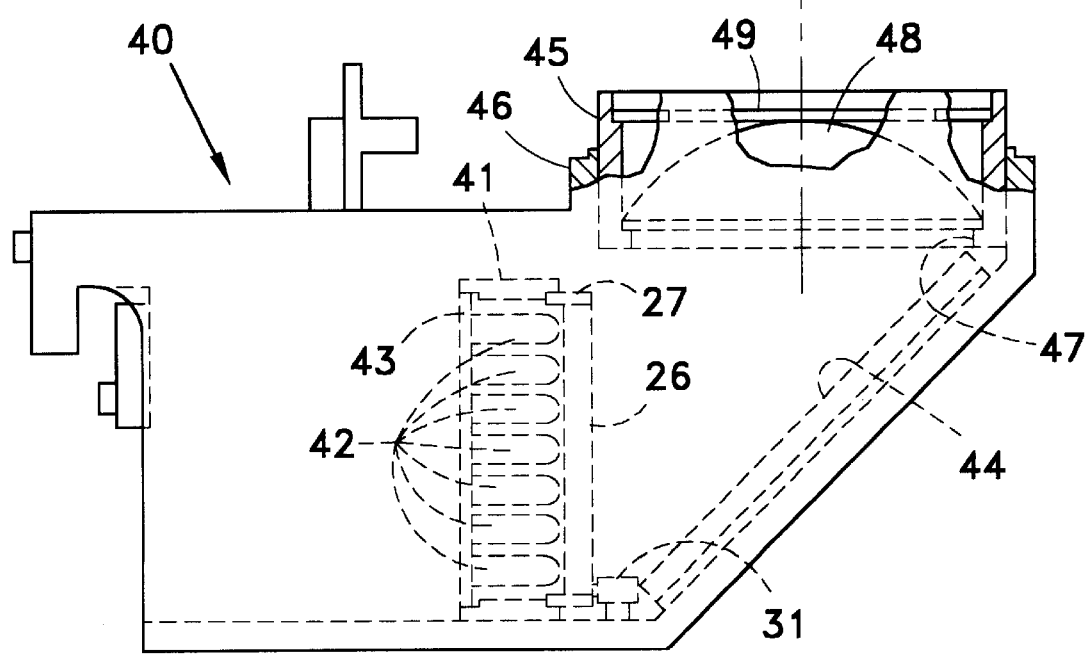
FIG. 3 is a side elevational view of a modified form of the improved substage illuminator, a portion of the housing of the illuminator being broken away and shown in section for purposes of illustration.

Referring now to the embodiment shown in FIGS. 3 and 4, wherein like numerals are employed to denote elements similar to those employed in the first embodiment, 40 denotes a modified variable F/substage illuminator housing having mounted therein intermediate its ends a circular housing 41 containing a plurality of light emitting diodes (LED's) 42. The diodes 42 project from a circuit board 43 in radially spaced circular arrays coaxially of housing 41 with center lines thereof disposed coaxially about a horizontal axis, and with the light emitting ends thereof facing one side of an adjustable iris 26 that is secured in the housing 41 over the light emitting ends of the LED's 42. In this embodiment the diaphragm adjusting ring 27 of the iris 26 is drivingly connected to a pinion gear (not illustrated) operated by the stepping motor 31 that is mounted in the housing 40 adjacent the bottom wall thereof Illumination from the LED's 42 after passing through the diaphragm in iris 26 is directed onto the reflecting surface of a mirror 44 which is mounted on the inside surface of an inclined wall of housing 40 so that the reflecting surface of the mirror 44 lies in a plane extending at 45° horizontal, and to the beams of light emitted by the LED's 42. Light reflected upwardly by the mirror 44 passes through a central opening 47 formed in the lower end of an annular lens housing 45, which is secured coaxially and the bore of an annular, upper wall section 46 of the housing 40. Secured in housing 45 with its plane surface seated coaxially on an integral ring flange formed in the open, lower end of housing 45, is a large, circular collimating lens 48, the upper, curved surface of which registers with and is slightly spaced beneath a circular, anti-glare filter 49 which is secured in a counterbore in the upper end of the housing 45 to overlie the lens 48.

In use, the parallel beams of light emanating from the LED's 42 are projected upwardly in housing 40 passing first through the collimating lens 48, then through the anti-glare filter 49 to the underside of the workpiece that is being inspected, and which is positioned beneath the optical magnification system 38. In practice, while the workpiece that is being inspected is not mounted for vertical movement, the inspection mechanism often is in fact mounted for vertical adjustment toward and away from the workpiece, such movement also being accompanied by adjustment of the magnification of the image of the workpiece. For proper illumination at different magnifications, it is necessary to control the diameter of the source of illumination provided by the LED's 42. In practice this is effected by selectively energizing the circular arrays for the LED's, in which case when only the radially innermost circular array of LED's is energized, then initially the diameter of the beam emitted by the energized LED's would be much smaller than the diameter of the beam produced when the LED's in the radially outermost array of LED's are energized. In any case, the anti-glare filter 49 serves to suppress annoying reflections arising form surface illuminators used in such equipment. In addition to selectively energizing the various circular arrays of LED's, the presence of the iris 26 enables even further control of the diameter of the beam of light directed toward the inspection apparatus.

Figure 5:
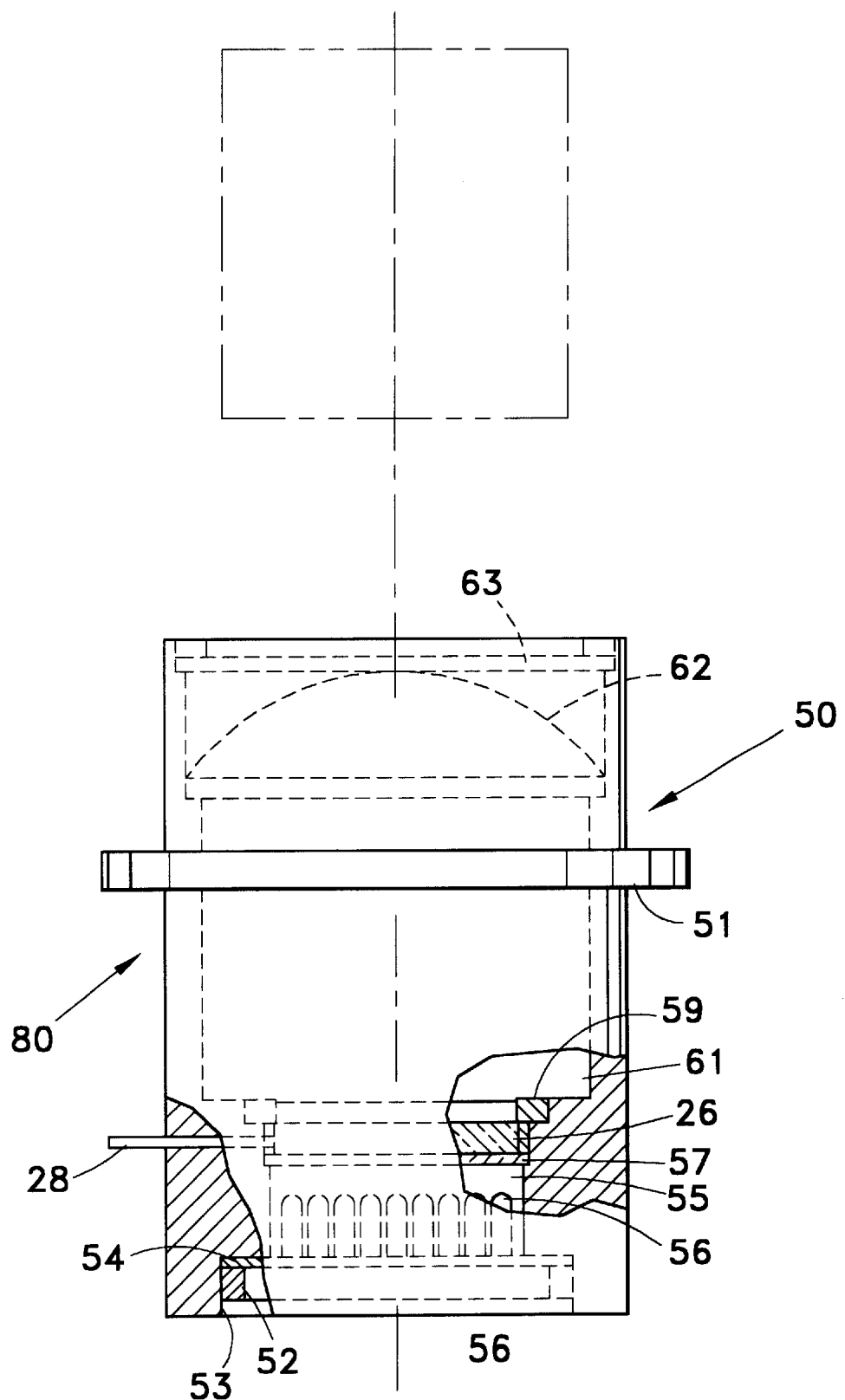
FIG. 5 is a side elevational view of another modified form of the substage illuminator, portions of the illuminator housing being broken away and shown in section for purposes of illustration.

Referring now to the embodiments shown in FIG. 5, 50 denotes generally a cylindrically-shaped, axially bored illuminator housing, which is surrounded intermediate its ends by an annular mounting bracket 51, which is secured coaxially to the outer peripheral surface of housing 50. Removably secured by a retainer ring 52 in a counterbore 53 formed in the lower end of housing 50, is a generally disc-shaped circuit board 54. Projecting from the upper surface of board 54 into the axial bore 55 in housing 50 are a plurality of LED's 56 which are arranged, as in the preceding embodiment, in a plurality of radially-spaced, circular arrays disposed coaxially of the housing bore 55. The upper, light emitting ends of the LED's confront upon the underside of a disc-shaped light shaping diffuser 57, which is mounted in another counterbore in housing 50 just above the LED's 56, and beneath an adjustable iris 26, which is secured in the same counterbore by another retainer ring 59. When the LED's 56 are illuminated, light beams therefrom pass upwardly through another, larger counterbore 61 formed in the upper end of housing 50, and successively through a collimating lens 62 that is mounted in the upper end of housing 50 beneath an anti-glare filter 63.

The iris 26 in housing 50 functions in the same manner as in the preceding embodiments, and for that purpose it has projecting from its adjusting ring an adjusting pin 28 which projects from the ring through an elongate slot formed in housing 50 for adjustment by a stepping motor (not illustrated) in the same manner as in the preceding embodiments.

In use, when the LED's 56 are energized, illumination therefrom passes successively through diffuser 55, the diaphragm opening in the iris 26, the collimating lens 62 and the anti-glare filter 63 to the aperture of the magnification mechanism in the inspection apparatus 38. Once again, the diffuser 57, the iris 26 and the collimating lens 62 produce for the inspection apparatus 38 a cone or angular range of light which can be adjusted to exactly fill the aperture of the optical inspection apparatus 38. As in the case of the filter 49 in the embodiment of FIGS. 3 and 4, filter 63 suppresses undesirable reflections from workpiece surfaces illuminated be any associated surface illuminator, and the convex surface of lens 62, which is true also of lens 48, forms a reduction of any image produced by the surface illuminator, and consequently of any annoying reflections.

Figure 6:
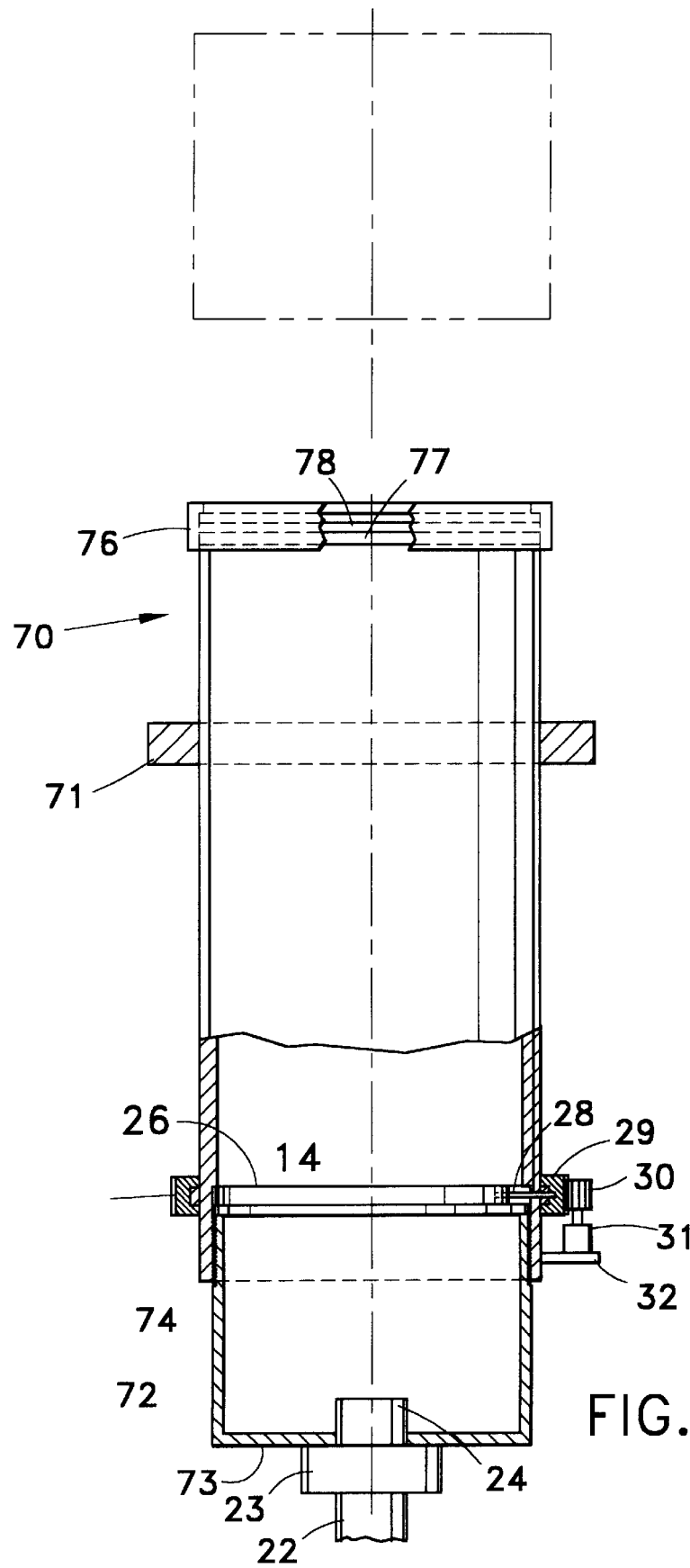
FIG. 6 is a side elevational view of still another form of an improved substage illuminator, portions of the housing thereof being broken away and shown in section for purposes of illustration.

Referring now to the embodiment shown in FIG. 6, again where like numerals are employed to denote elements similar to those employed in the preceding embodiments, 70 denotes generally a substage illuminator housing, which is tubular in configuration, and which has secured thereto intermediate its ends an annular mounting bracket 71 which is secured coaxially to the outer peripheral surface of housing 70. Inserted partway into the lower end of housing 70 is a circular, generally cup-shaped retainer 72 having an externally threaded upper end which is threaded in the lower end of housing 70, and having a closed lower end 73 having secured in the central opening therein the discharge or light emitting end 24 of a fiber optics conductor 22 which may be of the type employed in the first embodiment. Secured by the upper end of retainer 72 in the lower end of housing 70 is a disc-shaped light shaping diffuser 74, the upper surface of which has seated thereon an adjustable iris 26, a circumferential marginal portion of which is seated against an internal annular shoulder formed in housing 71. Diffuser 74 and the iris 26, therefore, are releasably secured against axial movement in the lower end of housing 70 by the retainer 72. Also, as in the preceding embodiments, the adjustable diaphragm in the iris 26 is connected in a manner previously described to an adjusting ring 29 which is rotatably mounted on the outer periphery of housing 70 for rotational adjustment by the stepping motor 31.

Releasably secured by a retainer ring 76 in a counterbore formed in the upper end of housing 70 is a Fresnel-collimator lens 77, the upper surface of which is covered by a disc-shaped anti-glare filter 78, which functions in a manner similar to the filter 35 in the first embodiment.

In use, light emitted from the discharge end 24 of the conductor 22 is diffused or shaped by the diffuser 74 passing through the aperture in the iris diaphragm, after which illumination is collimated by the Fresnel-collimator 77 and is transmitted through the filter 78 to the associated optical inspection apparatus 38. The embodiment of FIG. 6 incorporates the same advantages of the embodiments shown in FIGS. 1 and 2, but eliminates the need for employing the mirror 18.

Figure 8:
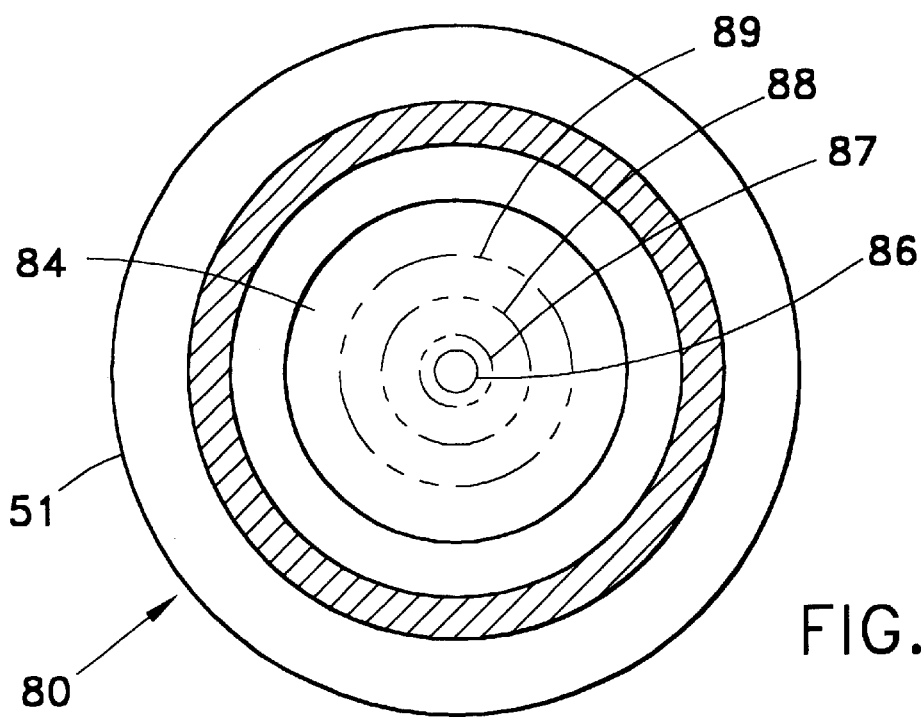
FIG. 8 is a sectional view taken along the line 7—7 in FIG. 7 looking in the direction of the arrows.
Figure 7:
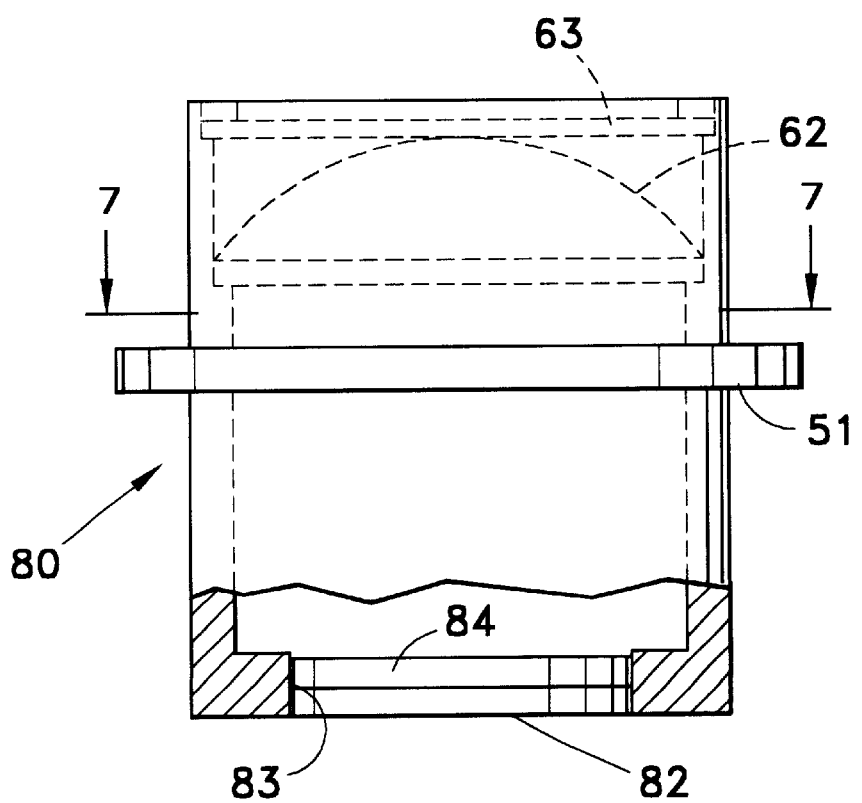
FIG. 7 is a side elevational view of a modified form of the substage illuminator shown in FIG. 5.

In the embodiment shown in FIGS. 7 and 8, numeral 80 denotes generally a modification of the housing shown in FIG. 5. In this embodiment, instead of using the circular arrays of LED's, those light sources are replaced by a conventional, generally disc-shaped L.C.D. aperture generator 82, which is secured in an axial bore 83 in the 15 lower end of housing 80. Generator 82 has mounted on its upper end a light producing section 84 having a generally planar upper surface confronting upon and axially spaced from the underside of the collimating lens 62, which as in the embodiment of FIG.;. 5, is mounted in the upper end of the counterbore in housing 80 beneath an anti-glare filter 63.

In use, generator 82 is operable selectively to produce coaxially of each other in the upper surface of its section 84 a series of annular rings of light which can be selected as desired. For example, as shown in FIG. 8, the annular beams produced by generator 82 may be any one of many different sizes as denoted by numerals 86–89, and each of which beams may correspond to a given F/number illumination, for example F/14, F/8, F/4.5 and F/2.5.

Notably, it has been found in the case of the embodiment shown in FIGS. 7 and 8 that it is not necessary to use an adjustable iris to control accurately the diameter of the beam emitted from housing 80, since this control is effected very satisfactorily by the L.C.D. mechanism. Likewise, if a light emitting electroluminescent light source were to be employed in place of the L.C.D. source; the light rings produced thereby would not have to be passed through an adjustable iris before reaching the collimating lens. Also, the anti-glare filters, which are employed to cover the disclosed collimating lenses, may be of the neutral density or polarizing variety. The light shaping diffusers 24, 57, and 74 may be of the type sold by Physical Optics Corporation, and function to homogenized the illumination irregularities in the light source.

From the foregoing it will be apparent that the present invention provides a relatively simple and inexpensive means for producing an improved substage illuminator which is particularly suitable for use in projecting carefully selected cones of illumination that match and exactly fill the aperture or apertures of optical inspection apparatus of the type that is particularly suited for operation at a variety of different magnifications and F-numbers. While the invention has been illustrated and described herein in connection with only certain embodiments, it will be apparent that this application is intended to cover any such modifications as may fall within the scope of one skilled in the art, or the amended claims.

What is claimed is:

1. In optical gaging apparatus for examining a workpiece positioned beneath the aperture of a variable magnification optical system, an improved substage illuminator, comprising a housing positioned beneath the workpiece that is to be examined, and having therein an opening registering with the aperture in said optical system, a light source connected to said housing and operable to direct a circular beam of light through said opening in said housing toward said aperture and the underside of said workpiece, a collimating lens in said housing between said light source and said opening to collimate said light beam, an anti-glare filter mounted in said housing over said opening at the side of said collimating lens remote from light source, and means for selectively adjusting the diameter of said beam of light directed through said opening, thereby to cause said beam exactly to match and to fill the aperture of said optical system for any adjustment of the F/number of said optical system.

2. In the apparatus as defined in claim 1, wherein said means comprises an adjustable iris diaphragm mounted in said housing between said light source and said lens.

3. In the apparatus as defined in claim 2, including a light shaping diffuser mounted in said housing between said iris diaphragm and said light source.

4. In the apparatus as defined in claim 1, wherein said lens is a Fresnel-type collimating lens.

5. In the apparatus as defined in claim 1, wherein said means comprises a plurality of radially spaced circular arrays of light emitting diodes (LED's) forming said light source, said arrays being selectively energizable to select the desired diameter of the circular beam emitted by said source.

6. In the apparatus as defined in claim 1, wherein said means comprises a circular L.C.D. aperture generator forming said light source and operable selectively to emit beams of light of selectively different diameters.

7. In the apparatus as defined in claim 1, wherein said housing has therein a circular bore one end of which defines said opening, a mirror is secured to said housing adjacent the opposite end of said bore and with the reflective surface thereof registering with said opening and disposed in a plane inclined to and extending transversely of the axis of said bore, and said light source directs said beam of light onto said reflective surface for projection thereby toward said opening.

8. In the apparatus as defined in claim 7, wherein said light source comprises a fiber optic conductor having a light emitting end confronting upon said reflective surface.

9. In the apparatus as defined in claim 7, wherein said light source comprises a plurality of selectively energizable, radially spaced circular arrays of LED's the light emitting ends of which confront upon said reflective surface.

10. In the apparatus as defined in claim 1, wherein said anti-glare filter is a neutral density filter.

11. In the apparatus as defined in claim 1, wherein said anti-glare filter is a polarizing filter.

12. In combination with optical gaging apparatus of the type having a variable F/number and variable magnification optical system for examining a workpiece positioned beneath an image inlet aperture of the system, an improved substage illuminator, comprising a housing disposed to be positioned beneath the workpiece that is to be inspected and having therein a circular bore disposed to register at one end thereof with the underside of the workpiece and with the inlet aperture of said system, an anti-glare filter mounted coaxially in said bore adjacent said one end thereof, a collimating lens mounted coaxially in said bore beneath and adjacent to said filter, a light source located adjacent the opposite end of said bore for projecting a circular beam of light successively through said lens and said filter and toward said workpiece and said inlet aperture, and means for selectively adjusting the diameter of said light beam to cause said beam exactly to match and to fill the aperture of said optical system for any adjustment of the F/number of said optical system.

13. The combination as defined in claim 12, wherein said means comprises an adjustable iris diaphragm mounted in said bore between said lens and said light source.

14. The combination as defined in claim 12, wherein said means comprises a plurality of radially spaced circular arrays of light emitting diodes (LED's) forming said light source, said circular arrays being selectively energizable to select the desired diameter of the light beam emitted by said source.

15. The combination as defined in claim 14, wherein said means further comprises an adjustable iris diaphragm mounted in said bore between said lens and said light source and adjustable to alter the diameter of the light beam produced by said light source.

16. The combination as defined in claim 15, including a light shaping diffuser mounted in said bore between said light source and said iris diaphragm.

17. The combination as defined in claim 12, wherein said means comprises a circular L.C.D. aperture generator forming said light source and operable selectively to emit beams of light of selectively different diameters.

18. The combination as defined in claim 12, wherein said filter is a neutral density filter.

19. The combination as defined in claim 12, wherein said filter is a polarizing filter.

20. The combination as defined in claim 12, wherein said lens is a Fresnel-type collimating lens.

* * * * *